US010222515B2

(12) United States Patent
Heinemann et al.

(10) Patent No.: US 10,222,515 B2
(45) Date of Patent: Mar. 5, 2019

(54) ILLUMINATION DEVICE (71) Applicant: Dr. Ing. h.c. F. Porsche Aktiengesellschaft, Stuttgart (DE)

(72) Inventors: Jens Heinemann, Bietigheim-Bissingen (DE); Christoph Dambowy, Wiernsheim (DE); Ralf Sachs, Weil der Stadt (DE); Alexander Rabek, Calw (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 165 days.

(21) Appl. No.: 14/935,488

(22) Filed: Nov. 9, 2015

(65) Prior Publication Data

US 2016/0131320 A1 May 12, 2016

(30) Foreign Application Priority Data

Nov. 12, 2014 (DE) .................. 10 2014 116 517

(51) Int. Cl.
*F21V 14/00* (2018.01)
*G02B 5/00* (2006.01)
*B60Q 1/00* (2006.01)
*F21S 41/29* (2018.01)
*F21S 41/20* (2018.01)
(Continued)

(52) U.S. Cl.
CPC ........... *G02B 5/003* (2013.01); *B60Q 1/0052* (2013.01); *F21S 41/28* (2018.01); *F21S 41/29* (2018.01); *F21S 43/14* (2018.01); *F21S 43/237* (2018.01); *F21S 43/245* (2018.01); *F21S 41/24* (2018.01); *F21S 43/235* (2018.01); *G02B 6/001* (2013.01)

(58) Field of Classification Search
CPC ..... G02B 5/003; G02B 6/001; F21S 48/2268; F21S 48/2237; F21S 43/235; F21S 43/236; F21S 43/237; F21S 43/245; F21S 43/247; F21S 41/24; F21S 41/285; F21S 41/29; B60Q 3/64; B60Q 1/0052
USPC ........................................................ 362/511
See application file for complete search history.

(56) References Cited

U.S. PATENT DOCUMENTS 4,790,618 A 12/1988 Abe
5,432,876 A * 7/1995 Appeldorn ............. G02B 6/001
362/554
(Continued)

FOREIGN PATENT DOCUMENTS

DE 19520934 A1 12/1996
DE 69510124 T2 3/2000
(Continued)

OTHER PUBLICATIONS

Funabiki, Stereoscopic display device, May 10, 2012, English, JP2012088647A.*

*Primary Examiner* — Bryon T Gyllstrom
*Assistant Examiner* — James M Endo
(74) *Attorney, Agent, or Firm* — Leydig, Voit & Mayer, Ltd.

(57) ABSTRACT

An illumination device includes an optical waveguide having an optical waveguide start and an optical waveguide end. At least one light-emitting diode is assigned to the optical waveguide start. A light-absorbing element is arranged at the optical waveguide end. The light-absorbing element includes an adhesive bed with an adhesive. The adhesive of the adhesive bed has light-absorbing properties.

20 Claims, 4 Drawing Sheets (51) Int. Cl.
*F21S 43/14* (2018.01)
*F21S 43/237* (2018.01)
*F21S 43/245* (2018.01)
*F21V 8/00* (2006.01)
*F21S 41/24* (2018.01)
*F21S 43/235* (2018.01)

(56) References Cited

U.S. PATENT DOCUMENTS

| | | | |
|---|---|---|---|
| 5,596,210 A | 1/1997 | Konishi et al. | |
| 6,854,869 B1* | 2/2005 | Fernandez | A47C 7/725 297/184.17 |
| 2004/0136203 A1* | 7/2004 | Gasquet | B60Q 1/2607 362/543 |
| 2009/0154186 A1* | 6/2009 | Natsume | B60Q 1/0041 362/516 |
| 2010/0066938 A1* | 3/2010 | Lee | G02B 6/0088 349/58 |
| 2010/0202153 A1* | 8/2010 | Schwab | B60Q 1/0041 362/520 |
| 2011/0228549 A1* | 9/2011 | Lindsay | G02B 6/0006 362/555 |
| 2012/0069592 A1* | 3/2012 | Natsume | B60Q 1/0052 362/511 |
| 2012/0092591 A1* | 4/2012 | Zheng | G02B 6/0055 349/62 |
| 2012/0195066 A1* | 8/2012 | Doyle | G02B 6/0055 362/602 |
| 2012/0275178 A1* | 11/2012 | Logunov | F21V 13/02 362/552 |
| 2012/0287676 A1* | 11/2012 | Chen | G02B 6/006 362/627 |
| 2012/0314448 A1* | 12/2012 | Nakada | F21S 43/247 362/602 |
| 2013/0088888 A1* | 4/2013 | Fewkes | G02B 6/001 362/558 |
| 2013/0093981 A1 | 4/2013 | Yu | |
| 2013/0201709 A1* | 8/2013 | Natsume | B60Q 1/00 362/511 |
| 2013/0242609 A1* | 9/2013 | Mori | G02B 6/0088 362/611 |
| 2013/0265790 A1* | 10/2013 | Saito | F21S 48/1241 362/511 |

FOREIGN PATENT DOCUMENTS

| | | |
|---|---|---|
| DE | 102011011462 A1 | 8/2011 |
| DE | 102011015161 A1 | 5/2012 |
| DE | 102012109422 A1 | 4/2014 |
| JP | 2001521200 A | 11/2001 |
| JP | 2003281920 A | 10/2003 |
| JP | 200953549 A | 3/2009 |
| JP | 2012088647 A * | 5/2012 |
| JP | 2014203547 A | 10/2014 |

\* cited by examiner

Fig. 5

ILLUMINATION DEVICE

CROSS REFERENCE TO RELATED APPLICATIONS

Priority is claimed to German Patent Application No. DE 10 2014 116 517.9, filed on Nov. 12, 2014, the entire disclosure of which is hereby incorporated by reference herein.

FIELD

The invention relates to an illumination device and a headlamp arrangement.

BACKGROUND

Among others, optical waveguides that have elongate bodies are used in headlamps of motor vehicles, wherein light is transported through such an optical waveguide and is at least partially coupled out along the optical waveguide such that a light source is provided by way of the optical waveguide that is arranged in a headlamp.

A light-triggered semiconductor apparatus having a semiconductor substrate and a light-input path is known from document DE 695 10 124 T2. Here, a film with which a light reflection is prevented is applied on an end section of the light-input path.

Document U.S. Pat. No. 4,790,618 discloses a semiconductor laser module comprising an optical fiber, wherein a reflection-avoiding film is arranged at one end of said optical fiber.

SUMMARY

In an embodiment, the present invention provides an illumination device including an optical waveguide having an optical waveguide start and an optical waveguide end. At least one light-emitting diode is assigned to the optical waveguide start. A light-absorbing element is arranged at the optical waveguide end. The light-absorbing element includes an adhesive bed with an adhesive. The adhesive of the adhesive bed has light-absorbing properties.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention is to couple light that is transported through an optical waveguide out of it, while taking care to avoid the coupling out of light, which is undesired at a specific location of the optical waveguide.

In an embodiment, the present invention provides an illumination device including an optical waveguide or an optical fiber having an optical waveguide start or an optical fiber start at a first end of the optical waveguide and having an optical waveguide end or an optical fiber end at a second end of the optical waveguide. Here, a light-absorbing element is arranged, typically affixed by way of adhesive bonding, at the optical waveguide end.

Arranged at the optical waveguide start is typically a light-emitting element, preferably a lamp or light-emitting diode, the light of which is coupled into the optical waveguide and conducted thereby.

The optical waveguide end is arranged in the light-absorbing element, wherein the light-absorbing element has adhesive. In one configuration, the light-absorbing element is configured as an adhesive bed or adhesive bond which is bonded to and/or adhesively affixed on the optical waveguide end, or is to be referred to as such. The amount of adhesive that is bonded to and/or adhesively affixed on the optical waveguide end here forms the light-absorbing element. The optical waveguide end is adhesively affixed on, and thus fixed to, a further component, for example a holding element, using the adhesive or the adhesive bed. For this, generally liquid adhesive is to be arranged on and/or applied to the optical waveguide end, wherein the light-absorbing element in a configuration is to be formed by cured adhesive and/or have cured adhesive. It is furthermore possible for the light-absorbing element to have at the optical waveguide end a plurality of light-absorbing partial elements, wherein at least one of said light-absorbing partial elements is adhesively bonded on or to the optical waveguide end and encloses it. The optical waveguide end and the optical waveguide are adhesively joined with, and thus connected to, at least one further component of the headlamp arrangement, for example a housing, a lens and/or a reflector, via at least one light-absorbing partial element.

An end section of the optical waveguide is at least partially enclosed and/or adhesively encapsulated by the light-absorbing element, for example the adhesive bed. The optical waveguide end typically forms an outer wall of the end section of the optical waveguide.

In further configuration, the illumination device comprises at least one reflector which is also configured as a component of the headlamp arrangement. Said reflector comprises a hole or a cutout which at least partially, and generally completely, encloses the optical waveguide end of the optical waveguide. Accordingly it is also possible for the end section of the optical waveguide to be enclosed by such a reflector. In further configuration, the light-absorbing element is also arranged in the hole of the reflector and thus at least partially enclosed by the reflector. The reflector thus encloses the hole or an opening in which at least the optical waveguide end and/or the light-absorbing element is or are arranged. In a configuration, the reflector comprises a plurality of reflector components which are connected or joined to one another and form a wall of the opening and/or of the hole in which the optical waveguide end and/or the light-absorbing element is or are arranged.

The light-absorbing element comprises at least one material or a dye. It is thus possible for the light-absorbing element to have a mixture of adhesive and the at least one material, wherein the at least one material is configured for absorbing the light at the optical waveguide end and is mixed into the adhesive.

The at least one dye of the light-absorbing element is configured to absorb light, which is to be transported in the direction of the optical waveguide end, in the range of a frequency or wavelength of the light to be transported. Generally, the light-absorbing element has various dyes which are mixed.

For producing the light-absorbing element, liquid adhesive, to which the at least one dye is mixed, is to be applied at least at the optical waveguide end, generally at the end section of the optical waveguide. In a configuration, the light-absorbing element should be adhesively affixed to the holding element of the illumination device using the still liquid adhesive. The light-absorbing element or the adhesive bed for holding the optical waveguide end should be provided after curing the previously still liquid adhesive. It is conceivable that all components that are to be connected together, i.e. the optical waveguide end, the reflector and the lens, are preassembled. The still liquid adhesive is filled in or added to a correspondingly suitable cutout between the housing, lens, optical waveguide end and reflector, wherein the components are connected directly or indirectly upon curing of the adhesive.

Provision is furthermore made for at least a portion of the light that is to be transported through the optical waveguide along a light transport direction from the optical waveguide start to the optical waveguide end to be radiated from the optical waveguide perpendicular to the light transport direction.

As already mentioned, the optical waveguide is typically configured as an elongate optical fiber and/or is to be referred to as such, along which optical fiber light is to be transported from the optical waveguide start or optical fiber start to the optical waveguide end or optical fiber end, wherein light that is incident on the optical waveguide end is to be absorbed by the light-absorbing element.

A headlamp arrangement according to an embodiment of the invention comprises at least one illumination device having at least one optical waveguide which has an optical waveguide start and an optical waveguide end, wherein a light-absorbing element is arranged on, generally adhesively bonded and/or affixed to, the optical waveguide end of the at least one optical waveguide.

Said headlamp arrangement is configured for example as external illumination on a vehicle, typically a motor vehicle.

The headlamp arrangement has a lens as a transparent outer wall, through which at least a portion of light is to be radiated, which in an embodiment is to be transported through the at least one optical waveguide along a light transport direction from the optical waveguide start to the optical waveguide end, wherein transported light is to be radiated or emitted from the at least one optical waveguide at least in part perpendicular to the intended light transport direction.

In addition, the headlamp arrangement comprises an opaque reflector having a hole which at least partially, generally completely, encloses the optical waveguide end. The optical waveguide end is adhesively affixed via the light-absorbing element for example to a component or a component part of the headlamp arrangement which is covered by the opaque housing.

The end section of the optical waveguide is typically configured to be in the shape of a cylinder. Here, an outer wall of the optical waveguide in the region of the end section corresponds to the barrel of a cylinder. The optical waveguide end, however, can also have other geometric shapes, depending on how the optical waveguide is stepped at the end.

On account of the provision of the light-absorbing element which at least covers the optical waveguide end and in a configuration at least partially encloses the end section of the optical waveguide, it is firstly avoided that light exits the optical waveguide by the optical waveguide end. Additionally, the light-absorbing element permits light that arrives at the optical waveguide end to be absorbed and thus "swallowed." Also avoided in this way is that light is reflected from the optical waveguide end back into the optical waveguide, as a result of which reflections or what are known as hotspots at the optical waveguide end are avoided.

Further advantages and embodiments of the invention can be gathered from the description and the accompanying drawing.

It is to be appreciated that the previously mentioned features and the features which will be explained below can be used not only in the respectively stated combination but also in other combinations or alone, without departing from the scope of the present invention.

Figure 1:
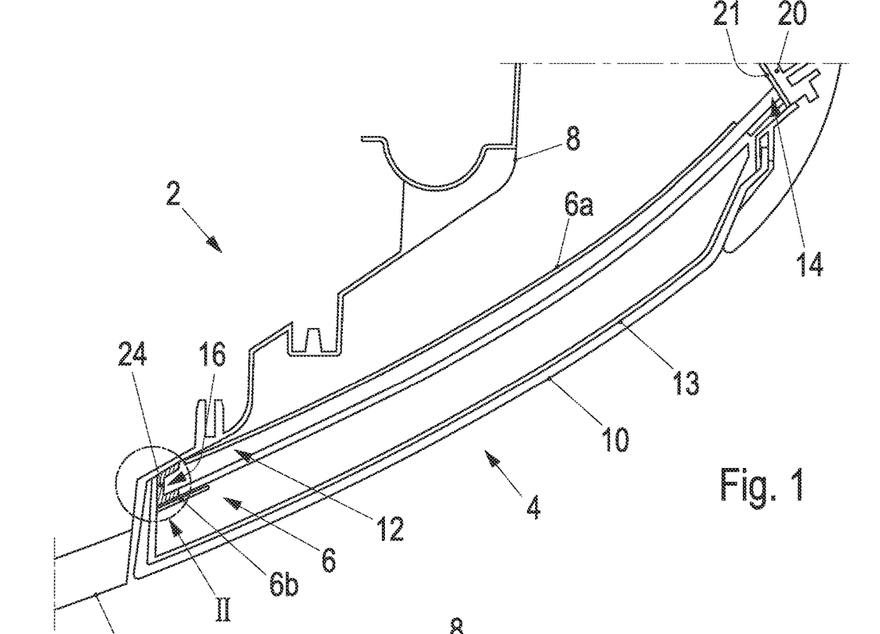
FIG. 1 shows a schematic illustration of a headlamp arrangement according to an embodiment of the invention having an illumination device according to an embodiment the invention.

The first embodiment of the headlamp arrangement 2 according to the invention, which in the present case is configured as a front lamp, and the first embodiment of the illumination device 4 according to the invention are schematically illustrated in FIG. 1. A detail II of the illumination device 4 that is circled in FIG. 1 is additionally illustrated enlarged in FIG. 2.

Here, the headlamp arrangement 2 comprises an opaque housing 8 and a reflector 6, of which here a first reflector component 6a and a second reflector component 6b are shown, wherein the housing 8 is here attached to a chassis 7 in a front region of a motor vehicle. Accordingly, the headlamp arrangement 2 can also be referred to as a front lamp of the motor vehicle. In addition, the headlamp arrangement 2 comprises a transparent outer wall or a lens 10 which is here connected to the chassis 7 of the motor vehicle.

The first embodiment of the illumination device 4 according to the invention here comprises an optical waveguide 12, which is configured as an elongate optical fiber, wherein said optical waveguide 12 has at a first end an optical waveguide start 14 and an optical waveguide end 16 at a second end. In addition, a light module 13 is provided which is arranged behind the lens 10 and is configured for distributing and/or scattering light which is radiated from the optical waveguide 12.

Figure 2:
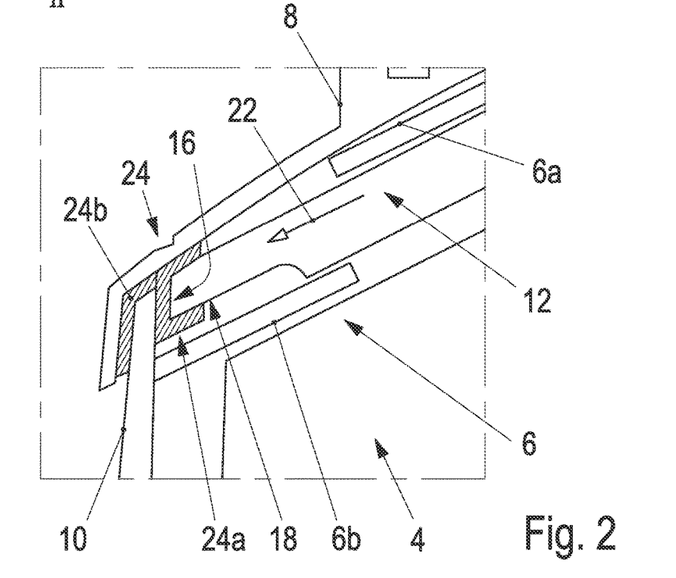
FIG. 2 shows a detail from FIG. 1.

As in particular shown by FIG. 2, an end section 18 of the optical waveguide 12 is configured largely cylindrically. The optical waveguide end 16 forms an external border and/or outer wall of the end section 18 of the optical waveguide 12 and here has an ellipsoid cross section. In an alternative configuration, the optical waveguide end 16 can also have a circular cross section.

The first reflector component 6a of the reflector 6 is arranged between the optical waveguide 12 and the housing 8. The second reflector component 6b is arranged between the end section 18 of the optical waveguide 12 and the light module 13 and the lens 12. Both reflector components 6a, 6b of the reflector 6 together enclose a hole or an opening in which the end section 18 of the optical waveguide 12 is disposed.

The illumination device 12 furthermore comprises a heat sink 20, illustrated in FIG. 1, made of aluminum and a printed circuit board 21 comprising at least one light-emitting diode (LED), the light of which is coupled into the optical waveguide start 14 and thus into the optical waveguide 12. The light that is coupled from the light-emitting diode into the optical waveguide 12 is transported in a light guide direction along the optical waveguide 12 and/or through the optical waveguide 12 in the direction of the optical waveguide end 16. The light transport direction in FIG. 2 is symbolized by an arrow 22. What becomes clear is that the light is guided to the opposite optical waveguide end 16 of the optical waveguide 12.

In the first embodiment of the illumination device 4, as presented here, a light-absorbing element 24 is adhesively fixed and thus arranged at the optical waveguide end 16 or at the end section 18 comprising the optical waveguide end 16. Said light-absorbing element 24 comprises a first light-absorbing partial element 24a and a second light-absorbing partial element 24b, wherein this light-absorbing element 24 encloses the optical waveguide end 16 completely and encloses at least partially the end section 18 of the optical waveguide 12. In addition, at least the first partial element 24a of the light-absorbing element 24 is enclosed by the reflector 6, i.e. by the two reflector sections 6a, 6b and thus received or arranged in a hole inside the reflector 6, wherein a wall of said hole is formed by the connected reflector sections 6a, 6b.

The light-absorbing element 24 is here formed from a cured adhesive, to which at least one dye is mixed, wherein the light that is incident on the optical waveguide end 16 is absorbed by this at least one dye, as a result of which the reflections or hotspots, as they are known from the prior art, are avoided. Said light-absorbing element 24 in the first embodiment of the illumination device 4 described here is also to be referred to and/or is configured as an adhesive bed.

As shown by FIG. 2, both light-absorbing partial elements 24a, 24b of the light-absorbing element 24 enclose one end of the transparent lens 10. The end section 18 of the optical waveguide 12 is thus adhesively affixed by way of the optical waveguide end 16 via the light-absorbing element 24, here the two partial elements 24a, 24b, to the housing 8 and the lens 10 of the illumination device 4 and thus fixed via the light-absorbing element 24 indirectly to the transparent outer wall, or the lens 10.

In order to provide the light-absorbing element 24, the end section 18 of the optical waveguide 12 is to be immersed in liquid adhesive, to which the at least one dye is mixed. Provision is made thereafter for the end section 18 and thus also the optical waveguide end 16 of the optical waveguide 12 to be adhesively bonded to the housing 8 and the lens 10 via the light-absorbing element 24 to be provided. By curing the adhesive, the light-absorbing element 24 is formed, the first partial element 24a of which on one side encloses the end section 18 and on the other side provides a connection to the housing 8 and the lens 10.

Alternatively or additionally, it is possible for the end section 18 of the optical waveguide 12 with the optical waveguide end 16, the reflector 6 and an end section of the lens 10 to be preassembled, and, as shown in FIG. 2, to be arranged, wherein the optical waveguide end 16 is to be arranged in the hole of the reflector 6. Subsequently, the adhesive having the admixed dye is to be added, from which, upon curing thereof, the light-absorbing element 24 is formed, via which the optical waveguide end 16, the reflector 6 and the light-guide lens 10 are connected to one another.

Provision is made here for the at least one dye of the light-absorbing element 24 to be matched to a frequency or wavelength of the light that is produced by the at least one light-emitting diode of the printed circuit board 21 and is transported through the optical waveguide 12. The at least one dye is here configured such that it absorbs light that is to be transported through the optical waveguide 12.

The light-absorbing element 24, in particular the first light-absorbing partial element 24a, which encloses and/or covers the optical waveguide end 16, effects an absorption of light that is transported through the optical waveguide 12 along the light transport direction and is incident on the optical waveguide end 16.

The light-absorbing element 24, here the first partial element 24a or the adhesive bed of cured adhesive with at least one admixed dye, which encloses the end section 18 of the optical waveguide 12, forms a cutout in which the optical waveguide end 16 is arranged. Furthermore, at least the first light-absorbing partial element 24a is enclosed by the two reflector components 6a, 6b and thus by the reflector 6, here arranged in a hole that is bounded completely by the reflector components 6a, 6b.

FIG. 2 furthermore illustrates that the end section 18 and the light-absorbing element 24 are covered by the second reflector component 6b towards the outside.

Figure 3:
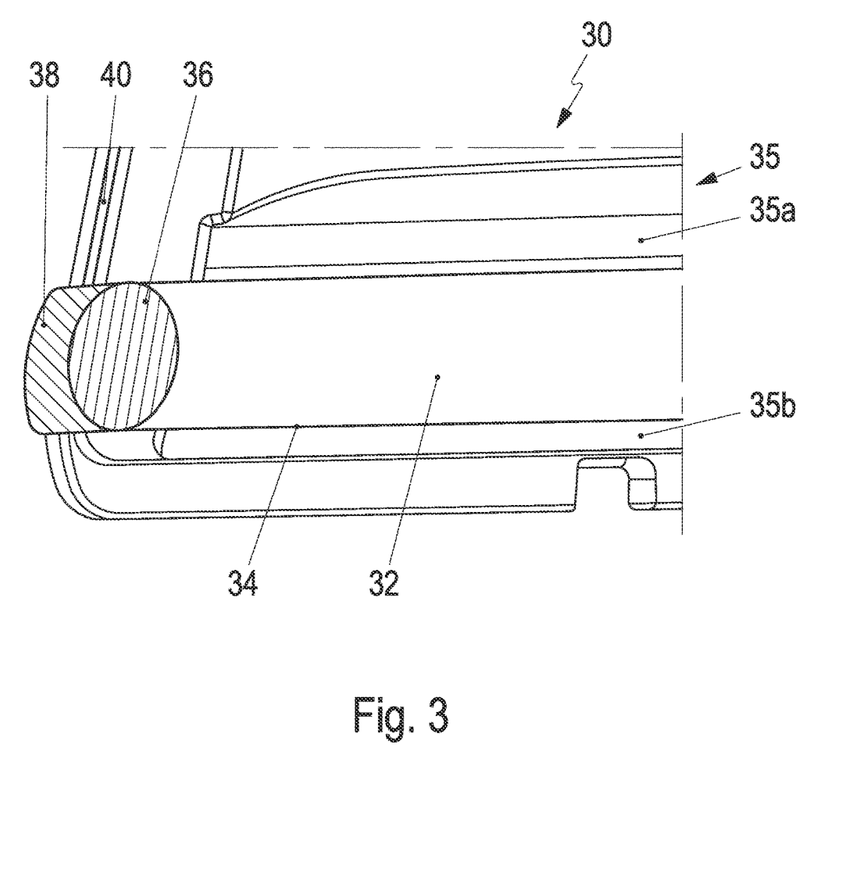
FIG. 3 shows a schematic illustration of a detail of an illumination device according to another embodiment the invention.

The second embodiment of the illumination device 30, illustrated schematically in FIG. 3, likewise comprises an elongate optical waveguide 32, of which FIG. 3 illustrates an end section 34. At one end of the optical waveguide 32, an optical waveguide end 36 forms an outer wall of the optical waveguide 32, wherein the optical waveguide end 36 here has a circular cross-sectional area. FIG. 3 also shows a first reflector component 35a and a second reflector component 35b of a reflector 35, which enclose or encloses a hole, wherein the end section 34 of the optical waveguide 32 is arranged inside this hole or a corresponding opening in the reflector 35 or is enclosed thereby.

Here, too, a light-absorbing element 38 is fixed to the optical waveguide end 36 by way of an adhesive bond. Said light-absorbing element 38 is illustrated only in part in FIG. 3. The light-absorbing element 38 here consists of cured adhesive to which at least one dye is mixed.

The end section 34 of the optical waveguide 32 and thus also the optical waveguide end 36 are to be arranged during manufacture of the illumination device 30 in the hole of the reflector 35 and be adhesively affixed and thus fixed to a holding element 40 using the still liquid adhesive having the at least one admixed dye. After the adhesive is cured, which at least partially encloses the end section 34 of the optical waveguide 32, the light-absorbing element 38 is to be provided during manufacture, which light-absorbing element 38 can also be referred to as adhesive bed in which the end section 34 of the optical waveguide 32 is at least partially received. The light-absorbing element 38 made of cured adhesive having at least one admixed dye has the shape of a cup having a cutout, wherein the optical waveguide end 36 and the end section 34 are arranged in the cutout of the light-absorbing element 38 and covered thereby.

During operation of the illumination device 30, as already described on the basis of the first embodiment of the illumination device 2, light is to be coupled from a light transmitter, which is arranged at an optical waveguide start of the optical waveguide 32 and has at least one light-emitting diode, into the optical waveguide 32 and transported through the optical waveguide along a light transport direction in the direction of the optical waveguide end 36.

The light that is transported in the direction of the optical waveguide end 36 during operation of the illumination device 30 and is incident on the optical waveguide end 36 is to be absorbed by the at least one dye, which is mixed into the adhesive of the light-absorbing element 38. What is avoided here is that light that is incident on the optical waveguide end 36 is reflected back into it. This prevents formation of what are known as hotspots at the optical waveguide end 36.

Figure 4:
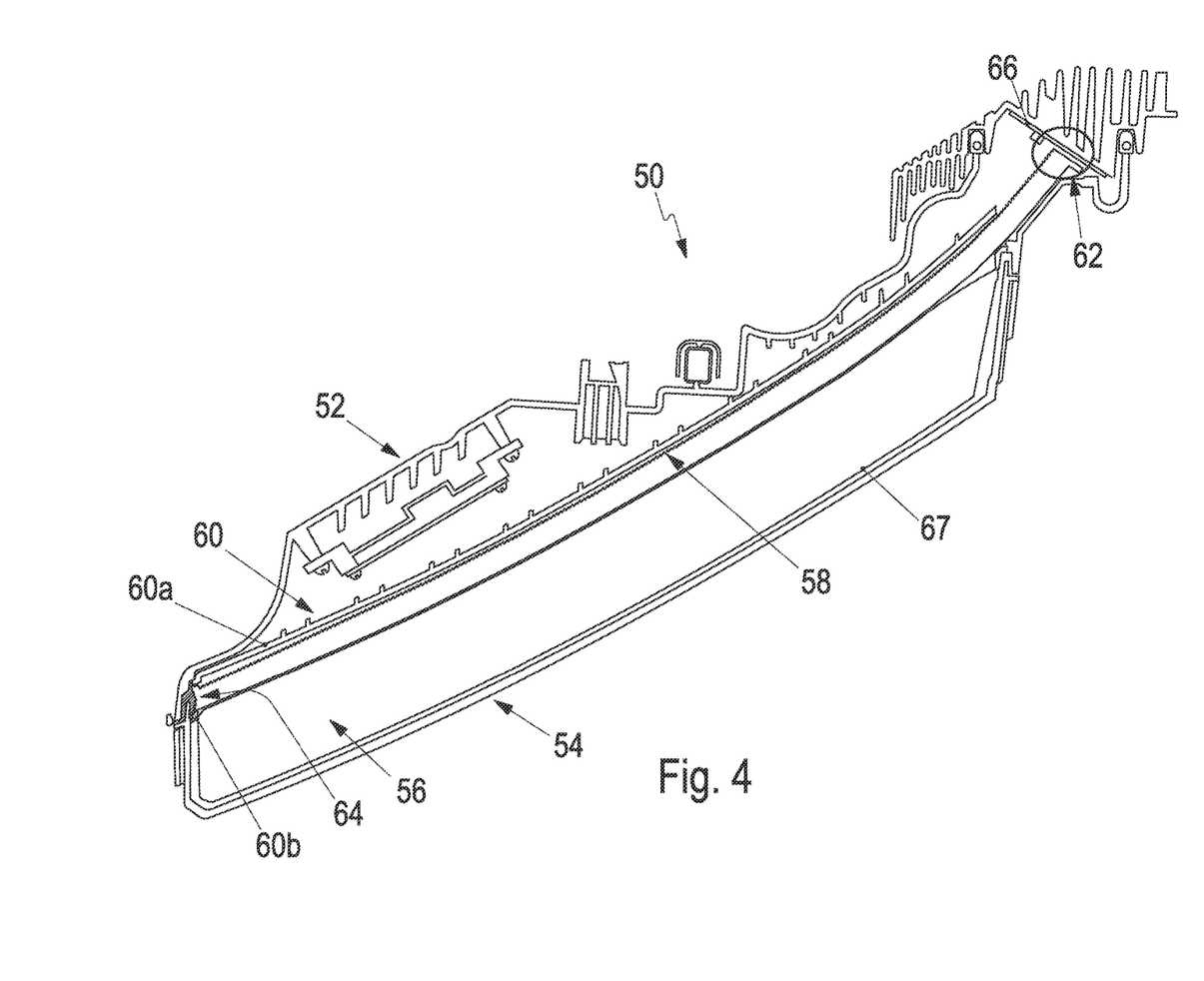
FIG. 4 shows a schematic illustration of a headlamp arrangement according to yet another embodiment the invention having an illumination device according to an embodiment the invention.

The third embodiment of the headlamp arrangement 50 according to the invention, schematically illustrated in FIG. 4, comprises a housing 52 and a lens 54 as the transparent outer wall. The housing 52 and the lens 54 here enclose an internal space of the headlamp arrangement 50, in which components of the third embodiment of the illumination device 56 according to the invention are arranged. Provided as components of the illumination device 56 are here at least an optical waveguide 58 and a reflector 60, which in the illustration in FIG. 4 comprises a first reflector component 60*a* and a second reflector component 60*b*. Provision is again made for the optical waveguide 58 to comprise an optical waveguide start 62 and an optical waveguide end 64. A printed circuit board 66, having at least one light-emitting diode via which light is coupled into the optical waveguide 58 and transported along the optical waveguide 58 up to the optical waveguide end 64, is arranged at the optical waveguide start 62.

FIG. 4 furthermore illustrates a light module 67, which is arranged inside the headlamp arrangement 50 at an inner wall of the lens 54 and is configured to scatter and/or distribute light that exits along the optical waveguide 58 between the optical waveguide start 62 and the optical waveguide end 64, wherein such scattered and/or distributed light is radiated furthermore through the lens 54 to the outside. Roughening or deliberate irregularities may be provided at the optical waveguide end 64 in order to suitably scatter light. This also applies to light that is radiated out along the optical waveguide 58 and is reflected by the reflector 60 to the outside.

Figure 5:
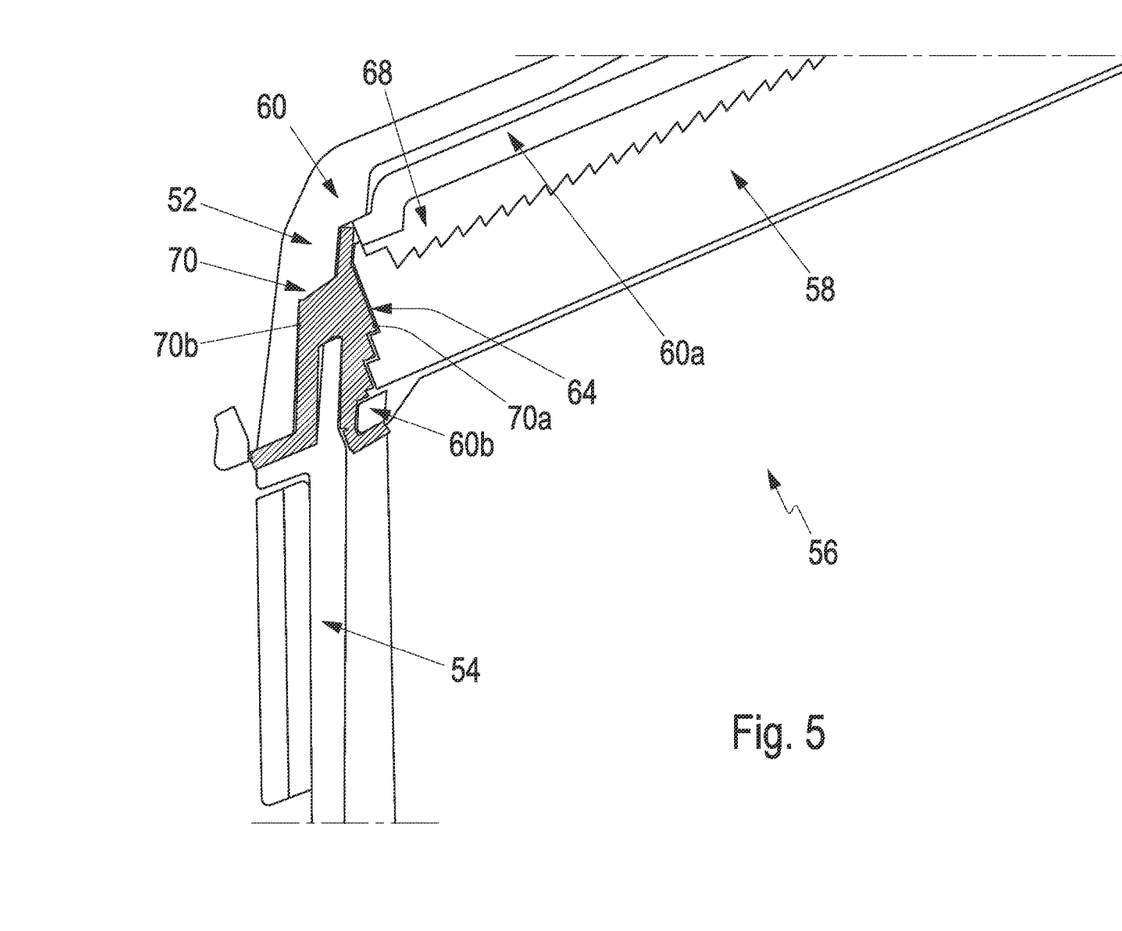
FIG. 5 shows a detail from FIG. 4.

Details relating to this third embodiment of the illumination device 56 according to the invention can be gathered from FIG. 5. It shows that an end section 68 of the optical waveguide, and thus also the optical waveguide end 64, is arranged inside an opening or hole, which is enclosed or formed by the two reflector components 60*a*, 60*b* and thus by the reflector 60.

Provision is made here for the optical waveguide end 64 of the optical waveguide 58 to be enclosed by a light-absorbing element 70 which here comprises a first light-absorbing partial element 70*a* and a second light-absorbing partial element 70*b*. This light-absorbing element 70 is formed from an adhesive which comprises at least one dye, and is adhesively bonded to the optical waveguide end 64. Provision is also made here for the first light-absorbing partial element 70*a* of the light-absorbing element 70 to at least partially enclose the second reflector component 60*b*.

An end section 68 of the lens 54 is furthermore enclosed by the two light-absorbing partial elements 70*a* and 70*b*, such that the optical waveguide end 64 is connected to the lens 54 via the light-absorbing element 70. FIG. 5 likewise illustrates that in each case one surface of the end section 68 and the optical waveguide end 64 of the optical waveguide 58 are roughened, as a result of which incident light is to be scattered. To this end, the end section 68 of the optical waveguide 58 is to be arranged in the hole of the reflector 60. In addition, the reflector 60 and the end section 68, as shown in FIG. 5, are to be arranged relative to an end section of the light-guide lens 54. Thereafter, the adhesive having the admixed dye is to be added. However, since the light-absorbing element 70 is first to be provided via a liquid adhesive, it is connected, after curing of the adhesive, in a coherent manner to the surface of the optical waveguide end 64 and the lens 54 and the reflector 60.

The printed circuit board 66 at the optical waveguide start 62 typically comprises a plurality of light-emitting diodes, which radiate light of different wavelengths and frequencies, respectively, and thus light of different frequencies and/or wavelengths, wherein such radiated light is coupled into the optical waveguide 58 and transported along the optical waveguide 58 up to the optical waveguide end 64. This may be white light for providing a position lamp, yellow or orange light for providing an indicator lamp, or, if the headlamp arrangement 50 is arranged in a rear region of a motor vehicle, red light with which a brake light is to be realized.

Independently of at least one frequency and/or wavelength of the light, said light is absorbed as soon as it reaches the optical waveguide end 64 by the light-absorbing element 70, in the present case primarily by the first light-absorbing partial element 70*a* at least partially, such that nearly no light exits to the outside and/or is reflected back into the optical waveguide 58. By providing the reflector 60 which encloses the optical waveguide end 64 and the light-absorbing element 70, an additional effect is that no or nearly no light can exit to the outside at the optical waveguide end 64.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An illumination device comprising:
   a housing connected to a chassis of a motor vehicle;
   a transparent lens;
   an optical waveguide having an optical waveguide start, an optical waveguide end, and an optical waveguide outer wall;
   at least one light-emitting diode arranged at the optical waveguide start;
   a light-absorbing element including an adhesive bed with an adhesive, the adhesive of the adhesive bed having light-absorbing properties, wherein the light-absorbing element completely encloses the optical waveguide end; and a reflector, the reflector including a first reflector component arranged between the optical waveguide and the housing and a second reflector component arranged between the optical waveguide and the transparent lens, wherein the first reflector component and the second reflector component together enclose a hole disposed between the housing and the transparent lens, wherein the optical waveguide end of the optical waveguide and the light-absorbing element are arranged in the hole enclosed by the first reflector component and the second reflector component.

2. The illumination device as recited in claim 1, wherein the light-absorbing element further encloses at least partially an end section of the optical waveguide.

3. The illumination device as recited in claim 1, wherein the light-absorbing element comprises at least one dye which is configured to absorb light having at least one frequency, which is to be transported in the direction of the optical waveguide end, in the range of the at least one frequency of the light.

4. The illumination device as recited in claim 1, wherein at least a portion of the light that is to be transported through the optical waveguide along a light transport direction from the optical waveguide start to the optical waveguide end is radiated from the optical waveguide perpendicular to the light transport direction.

5. The illumination device as recited in claim 1, wherein the optical waveguide is configured as an optical fiber.

6. The illumination device as recited in claim 1, wherein the light-absorbing element includes a cured adhesive that is applied on the optical waveguide end in a liquid state.

7. The illumination device as recited in claim 1, wherein the illumination device is arranged in one of a front region of the vehicle or a rear region of the vehicle.

8. The illumination device as recited in claim 1, wherein the optical waveguide is cylindrical.

9. The illumination device recited in claim 1, wherein the optical waveguide end of the optical waveguide has at least one of a circular cross section or an ellipsoid cross-section.

10. A vehicle headlamp arrangement, comprising:
a housing connected to a chassis of a motor vehicle;
a transparent lens;
an optical waveguide having an optical waveguide start, an optical waveguide end, and an optical waveguide outer wall;
at least one light-emitting diode arranged at the optical waveguide start;
a light-absorbing element including an adhesive bed with an adhesive, the adhesive of the adhesive bed having light-absorbing properties, the light-absorbing element completely enclosing the optical waveguide end; and
a reflector, the reflector including a first reflector component arranged between the optical waveguide and the housing and a second reflector component arranged between the optical waveguide and the transparent lens,
wherein the first reflector component and the second reflector component together enclose a hole disposed between the housing and the transparent lens,
wherein the optical waveguide end of the optical waveguide and the light-absorbing element are arranged in the hole enclosed by the first reflector component and the second reflector component.

11. The headlamp arrangement as recited in claim 10, wherein the light-absorbing element further encloses at least partially an end section of the optical waveguide.

12. The headlamp arrangement as recited in claim 10, wherein the light-absorbing element comprises at least one dye which is configured to absorb light having at least one frequency, which is to be transported in the direction of the optical waveguide end, in the range of the at least one frequency of the light.

13. The headlamp arrangement as recited in claim 10, wherein at least a portion of the light that is to be transported through the optical waveguide along a light transport direction from the optical waveguide start to the optical waveguide end is radiated from the optical waveguide perpendicular to the light transport direction.

14. The headlamp arrangement as recited in claim 10, wherein the optical waveguide is configured as an optical fiber.

15. The headlamp arrangement as recited in claim 10, wherein the light-absorbing element includes a cured adhesive that is applied on the optical waveguide end in a liquid state.

16. An illumination device comprising:
a housing connected to a chassis of a motor vehicle;
a transparent lens;
an optical waveguide having an optical waveguide start and an optical waveguide end;
at least one light-emitting diode arranged at the optical waveguide start; and
a light-absorbing element comprising a first light-absorbing partial element and a second light-absorbing partial element, the light absorbing element being arranged at the optical waveguide end and connected to the housing such that the first light-absorbing partial element completely encloses the optical waveguide end, the light-absorbing element including an adhesive bed with an adhesive, the adhesive of the adhesive bed having light-absorbing properties,
wherein both the first and second light-absorbing partial elements enclose one end of the transparent lens such that the optical waveguide is indirectly affixed to the transparent lens by the light-absorbing element.

17. The illumination device as recited in claim 16, wherein an end section of the optical waveguide is at least partially enclosed by the light-absorbing element.

18. The illumination device as recited in claim 1, further comprising a reflector having a hole therein, wherein the optical waveguide end of the optical waveguide is arranged in the hole of the reflector.

19. The illumination device as recited in claim 18, wherein the light-absorbing element is arranged in the hole of the reflector.

20. The illumination device as recited in claim 16, wherein at least a portion of the light that is to be transported through the optical waveguide along a light transport direction from the optical waveguide start to the optical waveguide end is radiated from the optical waveguide perpendicular to the light transport direction.

* * * * *